United States Patent
Frank

(10) Patent No.: US 9,360,043 B2
(45) Date of Patent: Jun. 7, 2016

(54) BALL BEARING

(75) Inventor: Hubertus Frank, Höchstadt (DE)

(73) Assignee: IMO Holding GmbH (DE)

( * ) Notice: Subject to any disclaimer, the term of this patent is extended or adjusted under 35 U.S.C. 154(b) by 0 days.

(21) Appl. No.: 13/261,307

(22) PCT Filed: Dec. 3, 2010

(86) PCT No.: PCT/EP2010/007339
§ 371 (c)(1),
(2), (4) Date: Sep. 24, 2012

(87) PCT Pub. No.: WO2011/066979
PCT Pub. Date: Jun. 9, 2011

(65) Prior Publication Data
US 2013/0011089 A1   Jan. 10, 2013

(30) Foreign Application Priority Data

Dec. 4, 2009 (DE) .......................... 10 2009 056 824
Mar. 31, 2010 (DE) .......................... 10 2010 013 741

(51) Int. Cl.
*F16C 33/58* (2006.01)
*F16C 19/16* (2006.01)

(52) U.S. Cl.
CPC ............. *F16C 19/166* (2013.01); *F16C 33/585* (2013.01); *F16C 2240/76* (2013.01)

(58) Field of Classification Search
CPC ..................................................... F16C 19/166
USPC .......................................... 384/513, 514, 516
See application file for complete search history.

(56) References Cited

U.S. PATENT DOCUMENTS

| | | | |
|---|---|---|---|
| 1,587,184 A | | 6/1926 | Riebe |
| 2,142,477 A | * | 1/1939 | Murden ........................ 384/516 |

(Continued)

FOREIGN PATENT DOCUMENTS

| | | |
|---|---|---|
| DE | 36 07 479 | 12/1986 |
| DE | 44 35 831 | 4/1996 |

(Continued)

*Primary Examiner* — Thomas R. Hannon
(74) *Attorney, Agent, or Firm* — Pandiscio & Pandiscio

(57) ABSTRACT

A ball bearing having first and second races and, disposed in a gap between the two races, a row of balls of radius $R_K$ that roll along facing tracks of the two races, wherein centers of the balls move on a circular path surrounded by a torus circumscribing all the balls of the row and having the toroidal radius $R_K$, a toroidal angle coordinate $\phi$, and a poloidal angle coordinate $\theta$, wherein each track has with each ball two nearly punctiform contact areas $P_1$, $P_2$; $P_3$ $P_4$ at respective contact angles $\theta_{P1}$, $\theta_{P2}$; $\theta_{P3}$ and $\theta_{P4}$, wherein the cross section of the track in the region of the contact points $P_1 \ldots P_4$ has a finite transverse radius of curvature $R_{L1} \ldots R_{L4}$, with $R_{Lv} > R_K$, and wherein in the vicinity of a contact point $P_1 \ldots P_4$ the transverse radius of curvature $(R_L)$ is a continuous and differentiable function of the poloidal angle coordinate $\theta$: $R_L = R_L(\theta)$ that increases outward from the respective contact point $P_1 \ldots P_4$ in both poloidal directions: $R_L(\theta) \geq R_L(\theta_{Pv})$.

21 Claims, 1 Drawing Sheet

(56) References Cited

U.S. PATENT DOCUMENTS

| | | | |
|---|---|---|---|
| 2,316,449 A * | 4/1943 | Parker | 384/516 |
| 3,370,899 A | 2/1968 | Eklund | |
| 3,858,288 A * | 1/1975 | Ladin et al. | 29/898.063 |
| 4,565,457 A * | 1/1986 | Flander | 384/450 |
| 5,051,004 A * | 9/1991 | Takeuchi et al. | 384/516 |
| 5,174,661 A * | 12/1992 | Nicolas et al. | 384/538 |
| 6,116,786 A | 9/2000 | Takata et al. | |
| 6,244,408 B1 * | 6/2001 | Tobayama et al. | 384/516 |
| 6,367,980 B1 | 4/2002 | Kobayashi | |
| 6,527,448 B1 * | 3/2003 | Gurka et al. | 384/513 |

FOREIGN PATENT DOCUMENTS

| | | | |
|---|---|---|---|
| DE | 198 54 277 | | 5/2000 |
| DE | 100 11 464 | | 8/2001 |
| DE | 103 27 641 | | 1/2005 |
| EP | 1288510 A2 * | | 3/2003 |
| GB | 811177 | * | 4/1959 |

* cited by examiner

BALL BEARING

BACKGROUND OF THE INVENTION

1. Field of the Invention

The invention is directed to a ball bearing having a first and a second race and, disposed in a gap between the two races, at least one row of balls of radius $R_K$, that roll along facing tracks of the two races, wherein centers of the balls of a row move on a circular path that is surrounded by a torus circumscribing all the balls of the row and having the toroidal radius $R_K$, a toroidal angle coordinate $\phi$ and a poloidal angle coordinate $\theta$, and wherein each track has with each ball two nearly punctiform contact areas or contact points $P_1$, $P_2$; $P_3$ $P_4$ at the respective contact angle $\theta_{P1}$, $\theta_{P2}$; $\theta_{P3}$ and $\theta_N$, and wherein the cross sections of the tracks in the region of the contact angles $\theta_{P1}$, $\theta_{P2}$; $\theta_{P3}$ and $\theta_{P4}$ have transverse curvatures possessing finite radii of curvature $R_{L1} \ldots R_{L4}$ each of which is greater than the ball radius $R_K$: $R_{Lv} > R_K$.

2. Description of the Prior Art

Such four-point bearings exist in various forms, for example as single- or multi-row ball bearings. The tracks used for such bearings often have a gothic profile, i.e., the transverse curvature sectionally follows a circular path segment, but two such circular path segments join at approximately the middle of the path to form an acute angle in the manner of a gothic arch. In this way, it is possible to have two contact points between a track and a ball despite radii of curvature $R_{L1} \ldots R_{L4}$ that are consistently greater than the ball radius $R_K$: $R_{Lv} > R_K$.

The poloidal angle assumed by a contact point, or contact area, is commonly referred to as the contact angle. Contact angles are often approximately between 40° and 50°, particularly approximately 45°, or between −40° and −50°, particularly approximately −45°, relative to a plane passing through centers of the balls of a row.

Due to this preferred contact-angle position, load components in the axial and radial directions always occur during load transfer. Even under exclusively axial loading, this arrangement always results in radial load components as well, which, in the presence of large bearing diameters of, for example, more than 0.5 m, preferably 1.0 m or more, particularly 2.0 m or more, cause radial expansion of the outer ring, on the one hand, and constriction of the inner ring, on the other.

Under combined loading, i.e., superimposed axial, radial and/or tilting moment loads, the races undergo elliptically shaped deformation. At the location where the highest load is being transferred, the outer race expands the most and the inner race constricts the most. Both races deform to ellipses whose principal axes are, however, rotated with respect to each other, particularly by approximately 90°, such that, for example, the large half-axes of the outer race approximately coincide with the small half-axes of the inner race, and the width of the gap between the two races consequently varies with the toroidal angle cp.

Since the two races are farthest apart in the regions where the highest load is being transferred, the contact angles are displaced the most at those locations. Depending on the deformation and rigidity of the adjacent construction, the contact angles can be shifted by up to ±65° or ±70°, or even as much as ±75°, or more.

Under high stress or some degree of bias, instead of a contact point between ball and race there is an area of contact, preferably of approximately elliptical shape, the so-called pressure ellipse. If, due to large displacement of the contact angle, this contact area, or pressure ellipse, approaches the bearing gap, it may be sheared off by the edge between the track and the bearing gap. If this occurs, not only does the loading of the ball in the rest of the contact area increase, but also, in particular, heightened edge pressures are created and will soon cause damage to the balls and tracks. The greater the diameter of the ball bearing and the lower the structural rigidity of an adjacent construction, the stronger this effect. Under unfavorable conditions, therefore, a four-point bearing must be abandoned in favor of a more elaborate and expensive bearing design, for example a multi-row roller bearing having at least one row of rollers with a contact angle of 90° for axial and tilting-moment loads, and at least one row of rollers with a contact angle of 0° for radial load transfer.

SUMMARY OF THE INVENTION

From the disadvantages of the described prior art arises the problem initiating the invention, that of improving a ball bearing of the above species so as to eliminate the described disadvantages of known four-point bearings. In particular, it would be desirable to devise an arrangement such that, despite heavy loading, the contact angles of the four-point bearing are not displaced too far from their normal positions.

DESCRIPTION OF THE PREFERRED EMBODIMENTS

This problem is solved by the fact that the transverse radius of curvature $R_L$ of the track(s) in the vicinity of the contact angles $\theta_{P1}$, $\theta_{P2}$; $\theta_{P3}$ and $\theta_{P4}$ is always a continuous and differentiable function of the poloidal angle coordinate $\theta$: $R_L = R_L(\theta)$, that increases outward from the respective contact angle region $\theta_{P1}$, $\theta_{P2}$; $\theta_{P3}$ and $\theta_{P4}$ in both poloidal directions, $R_L(\theta) \geq R_L(\theta_{Pv})$, even, where appropriate, beyond an inflection point $P_W$, in the case of a poloidal angle $\theta_W$ with a transverse radius of curvature $R_L(\theta_W) = \pm \infty$, and on to convex transverse radii of curvature $R_L(\theta) < 0$.

Thus, in each case the surface of the track diverges from a predefined contact angle $\theta_{P1}$, $\theta_{P2}$, $\theta_{P3}$ and $\theta_{P4}$ in both poloidal directions compared to a circular cross section, of the kind found in a torus, for example. Although this divergence need not be very great, it nevertheless has the effect that under deformation of the rings, for example due to external radial or axial forces or tilting moments, the actual contact angles do not shift as much as they would if the tracks had a circular cross section, particularly not to extremely high values in the range of 75° or more. Thus, the edge of the track is not overloaded even when stresses are very high and the rigidity of the adjacent construction low.

One effect of the smaller contact-angle displacement is that the balls are able to roll along the tracks with a lower proportion of slide motion. With less slide motion, the overall rolling behavior of the balls improves, thus reducing wear on the tracks and extending the effective useful life of the ball bearing.

Moreover, owing to the enhanced rolling properties, the rotational resistance of such a ball bearing is lower than in conventional four-point bearings. Thus, for motor-driven devices, machines or systems it becomes possible to use a weaker, i.e., lower-cost, drive; energy consumption goes down, thus sparing the environment. Installation of the bearing in wind or hydraulic power plants reduces internal power consumption and thus increases efficiency.

Based on the above specification, therefore, the transverse curvature of the tracks can be concave, with a transverse radius of curvature $R_L$ greater than the ball radius $R_K$, and at least regionally convex, with a transverse radius of curvature $R_L$ of less than 0. The intervening range of values $[0; R_K]$, however, is excluded or unsuitable for the transverse radius of curvature $R_L$.

It has proven advantageous for the track contour to present a finite osculation $S=(R_K/R_L) \cdot 100\% \neq 0$, with the exception of any inflection points of the track contour. The osculation is defined in this case as the ratio of the ball radius $R_K$ to the local transverse radius of curvature $R_L$ of the track, multiplied by 100%, and therefore varies, in a ball bearing according to the invention, according to the poloidal angle $\theta$.

A preferred design specification provides that the track contour presents in the region of each contact angle, i.e., where $\theta_{P_v} - 5° \leq \theta \leq \theta_{P_v} + 5°$, an osculation $S=(R_K/R_L) \cdot 100\%$ between 98% to 90%, preferably an osculation S of 97% to 92%, particularly an osculation S of 96% to 94%. Such high osculations—with the transverse radius of curvature $R_L$ of the track thus only a few percent greater than the ball radius $R_K$—would, in a conventional four-point bearing, soon lead to major displacement in the contact angles due to bearing stresses, and can therefore be achieved only in conjunction with the teaching of the invention.

The invention can be improved by having the track contour present in the vicinity of the bearing gap an osculation $S=(R_K/R_L) \cdot 100\%$ between 90% to 50%, preferably an osculation S of 90% to 60%, particularly an osculation S of 90% to 70%. As is apparent from this, the transverse radius of curvature $R_L$ of the track in the region of the bearing gap can be considerably greater than the ball radius, for example by 10% to 50%. Thanks to the inventive design, these areas of the track are virtually never contacted by the balls.

It is within the scope of the invention that the transverse curvature of the track(s) does not have a circular contour, particularly not even in segments, in the vicinity of the contact angle regions $\theta_{P1}$, $\theta_{P2}$; $\theta_{P3}$ and $\theta_{P4}$. It is precisely by deviating from a circular contour that the stated problems can be solved according to the invention.

The invention further provides that the transverse curvature of the track contour follows a continuous and differentiable function in the vicinity of the contact angle regions $\theta_{P1}$, $\theta_{P2}$; $\theta_{P3}$ and $\theta_{P4}$, preferably a power function or a polynomial function, for example $P(\theta)=a_0+a_1 \cdot \theta+a_2 \cdot \theta^2+ \ldots +a_n \cdot \theta^n$, or an exponential function, for example $E(\theta)=e^{f(\theta)}$, or an elliptical curve or a totalizing function $S(\theta)=\tau f_v(\theta)$ or any other combination of two or more such functions. It is important that there be continuousness and differentiability in the region of the contact angles $\theta_{P1}$, $\theta_{P2}$; $\theta_{P3}$ and $\theta_{P4}$ and their vicinity.

A particularly simple arrangement is obtained if the transverse curvature of the track contour is symmetrical. The plane of symmetry then extends within the ring plane, specifically midway between the two contact points of a ball with a track.

Alternatively, the transverse curvature of the track contour can also be asymmetrical, for example, if the axial loading of the bearing is asymmetrical, i.e., occurs primarily in an axial direction.

The invention can be improved by having the transverse curvature of the track contour present at at least one inflection point. Such an inflection point signifies a change in the transverse curvature of the track beyond $R_L=\infty$, and from $R_L=-\infty$ on to a negative transverse curvature with a diminishing radius of curvature, i.e., beginning at an inflection point and proceeding past it, the transverse curvature of the track is no longer concave, as it is in the immediate vicinity of the contact angle, but is convex from then on.

Taking this inventive idea farther, it can be provided that at least one inflection point of the transverse curvature of the track contour is in the vicinity of the bearing gap, i.e., at a substantial distance from the respective contact angle $\theta_v$. The osculation S could then actually be negative there, thus preventing the formation of a sharp edge, which also constitutes a way of increasing the achievable operating life.

The ball bearing is preferably a radial bearing. Alternatively, the invention can be used in axial bearings, particularly having two plates between which the rolling elements roll, for example, a shaft plate and a housing plate.

It is within the scope of the invention that one or preferably both races each have a respective planar contact face for connection to a foundation, frame, or other machine part or system part. By this means, on the one hand, the (rotational) guidance provided by the inventive ball bearings is transmitted to the system parts concerned. On the other hand, in this way a solid and therefore stable adjacent element can transfer its structural rigidity to the ball bearing, to protect the latter against deformation and other overstressing.

The planar contact face(s) preferably comprise(s) fastening means for connection to a foundation, frame, or other machine part, or system part. This is the only way to permit an exchange of forces between the ball bearing according to the invention and a connecting element.

The invention recommends that the fastening means be embodied as coronally distributed bores. A relatively large number of such fastening bores, preferably distributed equidistantly over a race, creates an intimate connection between the parts concerned, thus making it possible to transmit axial and tilting forces, as well as—via the friction grip caused by the pressed-together parts—torques and radial forces.

The bores used for fastening purposes can be configured as either through-bores or blind bores. They preferably effect fixation by means of through-passing or screwed-in machine screws, threaded bolts, or the like.

To this end, a design specification according to the invention provides that the bores, particularly blind bores, are provided with an internal thread. In the case of through-bores, lock nuts screwed onto the through-passed end can be used instead to secure the arrangement.

It has proven worthwhile for the planar contact faces of the two races that are provided for connection each to a respective foundation, frame or other machine part of system part, to point in opposite (axial) directions on the two races. As a result of this measure, the plane of the ball bearing according to the invention forms a kind of separation plane between the oppositely rotatable machine parts or system parts, one system part being above the ball-bearing plane and the other below it.

Additional advantages are gained if the planar contact face of a race that is provided for connection to a respective foundation, frame, or other machine part or system part, is elevated in the (axial) direction of the ball bearing with respect to the corresponding ring face of the other race. This keeps the end face of a race not serving as a contact face from brushing against the system part concerned.

Finally, it is within the teaching of the invention that the planar contact faces of both races that are to be connected each to a respective foundation, frame or other machine part or system part, are mutually offset in opposite (axial) directions on the two races, i.e., for example, the upper contact face being offset upward and the lower one downward. In this way, it is possible for both races to have approximately the same height and thus approximately the same cross section, as well as, ultimately, nearly identical stability.

Further features, details, advantages and effects based on the invention will become apparent from the following description of a preferred embodiment of the invention and by reference to the drawings.

DESCRIPTION OF THE PREFERRED EMBODIMENTS

Figure 1:
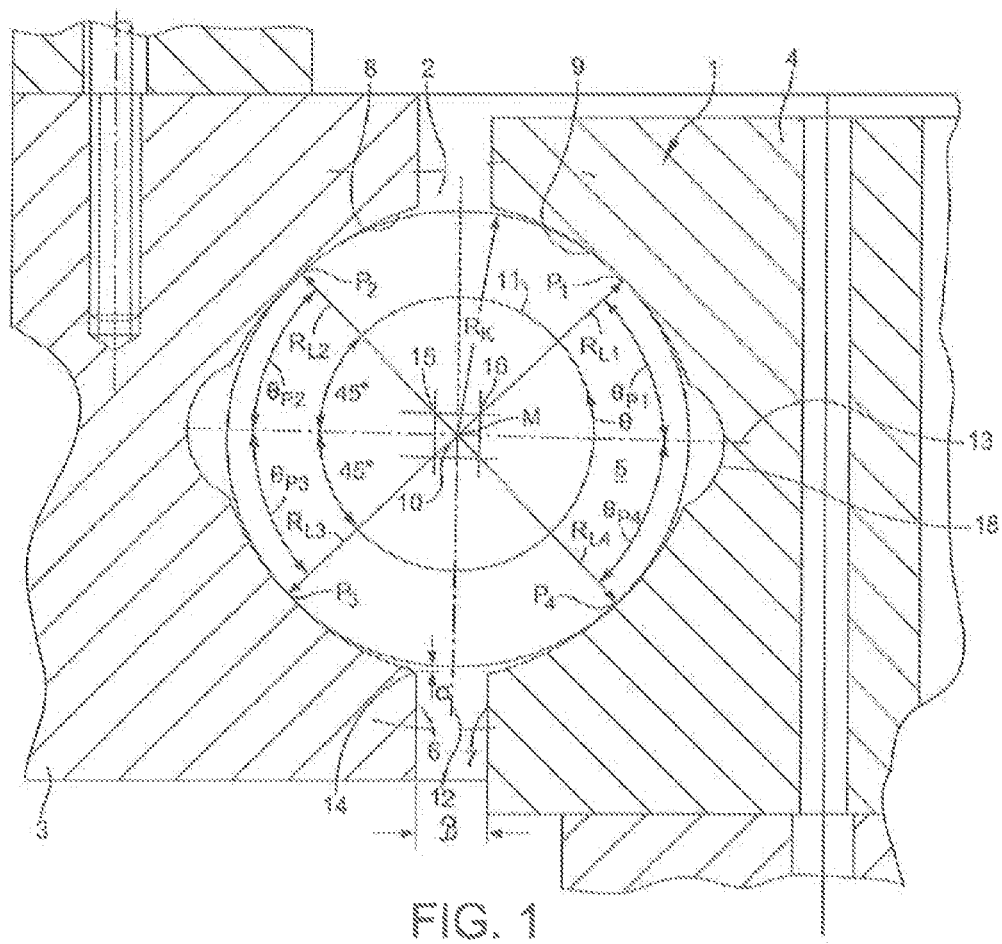
FIG. 1 is a partially broken-off cross section through a ball bearing according to the invention.

The section according to FIG. 1 runs transversely through a ball bearing 1 according to the invention, and is limited to half of each ring of the ball bearing 1 and confined to a detail in the vicinity of a gap 2 between two ball races 3, 4, in which can be seen a ball 5 with a ball radius $R_K$, representative of a row of balls, and the vicinity thereof. The illustrated ball bearing 1 is a radial bearing, with the axis of rotation of the bearing extending vertically, although—due to the large diameter of the inventive ball bearing 1—well beyond a vertical edge of the drawing sheet. The race 3 illustrated in broken-off form on the left corresponds to the outer ring, and the race 4 on the right, also depicted as broken off, to the inner ring; the axis of rotation of the ball bearing would then be to the right, outside the visible area of the drawing. The question of which race is the inner race and which the outer is, however, of secondary importance for the present invention.

As is clearly apparent, the face 6, 7 of each of the two races 3, 4 that faces the gap 2 comprises a respective fully circumferential track depression 8, 9. These two track depressions 8, 9 are able to accommodate the balls 5, and the width B of the gap 2 between the two races 3, 4 is therefore smaller than the ball diameter $D_K = 2 \cdot R_K$, preferably even smaller than the ball radius $R_K$.

As the balls 5 roll along between the two tracks 8, 9, their centers M move on a circular path 10, which in FIG. 1 passes perpendicularly through the plane of the drawing. In so doing, the ball elements move within an imaginary torus that surrounds the circular path 10 with a constant toroidal radius $R_K$. The points on the surface of this imaginary torus can be identified by means of a coordinate system composed of the toroidal angle coordinate φ and the poloidal angle coordinate θ. The toroidal angle φ is measured along circular path 10, and the poloidal angle θ along a circular path 11 whose plane is always intersected perpendicularly by the plane of circular path 10; in FIG. 1, this circular path 11 lies in the plane of the drawing. If the toroidal radius $R_K$ is generalized to a radial coordinate r, then the coordinate system φ, θ covering the surface of the imaginary torus can be extrapolated to the entire three-dimensional space, at least in the vicinity of the imaginary torus or inside the ball bearing 1. Hence, any point of the ball bearing 1 and therefore also any point of the two tracks 8, 9 can be assigned a toroidal angle φ and a poloidal angle θ.

The ball bearing 1 illustrated in FIG. 1 has symmetrical tracks 8, 9, although this is not absolutely necessary. In the example shown, this means that the cross sections of the two track contours 8, 9 are symmetrical to each other, specifically relative to a first axis of symmetry 12 that extends centrally along gap 2, i.e., remains equidistant from the two facing faces 6, 7 of the two races 3, 4. Perpendicular to this first axis of symmetry 12, specifically at the level of the ball center M or the circular path 10, there extends a second axis of symmetry 13; this second axis of symmetry 13 thus extends parallel to the base plane of the ball bearing 1. As can be appreciated from FIG. 1, these two axes of symmetry 12, 13 form a sort of coordinate intersection of a local Cartesian coordinate system, whose third coordinate axis would be the tangent to the circular path 10. The poloidal angle θ is preferably counted from the horizontally extending coordinate axis 13 in FIG. 1, i.e., from the coordinate axis that extends radially from the center of the ball races 3, 4 or toward the axis of rotation of the ball bearing 1.

The second axis of symmetry 13 divides each of the two tracks 8, 9 into two sections—an upper section and a lower section—which are preferably symmetrical to each other relative to the second axis of symmetry 13.

In the cross section of FIG. 1, the intersecting axes of symmetry 12, 13 result in the formation of a total of four quadrants. Both tracks 8, 9 are fashioned in such a way that each of these four quadrants contains a contact point of a track 8, 9 with the ball 5, specifically contact points $P_1$, $P_2$, $P_3$ and $P_4$, which can be found under the respective poloidal angular nodes of respective so-called contact angles.

FIG. 1 shows the ball bearing 1 in the condition of being free of external forces, the contact angles $\theta_{P1}$, $\theta_{P2}$, $\theta_{P3}$ and $\theta_{P4}$ being at the intended values, in the illustrated example each offset upward or downward from the central bearing plane 13 by a contact angle of approximately ±45°, similarly to the arrangement of a four-point bearing.

In the vicinity of these contact angles, i.e., for example, within the regions $[\theta_{P1}-\Delta, \theta_{P1}+\Delta]$, $[\theta_{P2}-\Delta, \theta_{P2}+\Delta]$, $[\theta_{P3}-\Delta, \theta_{P3}+\Delta]$ and $[\theta_{P4}-\Delta, \theta_{P4}+\Delta]$, for example with $\Delta=1°$ or $\Delta=2°$ or $\Delta=5°$ or the like, the tracks 8, 9 each have a transverse radius of curvature of $R_{LT} \approx R_K$, but slightly greater: $R_{LT} > R_K$. The osculation S at these sites is 98% to 90%.

From this region outward, the transverse radius of curvature $R_L$ increases progressively, specifically according to a continuous and differentiable function. The contours of the tracks 8, 9 therefore diverge outwardly (relative to the ball center M) in both directions from the contact angle regions $[\theta_{P1}-\Delta, \theta_{P1}+\Delta]$, $[\theta_{P2}-\Delta, \theta_{P2}+\Delta]$, $[\theta_{P3}-\Delta, \theta_{P3}+\Delta]$ and $[\theta_{P4}-\Delta, \theta_{P4}+\Delta]$ compared to a circle line with radius $R_{LT}$, since, in these regions beyond or distant from the contact angle regions, $R_L > R_{LT}$.

Figure 2:
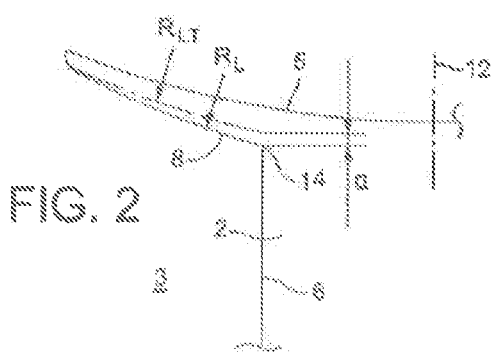
FIG. 2 is an enlargement of detail II from FIG. 1.

It can be seen in FIG. 2 that, as a result, in the region of the track edge 14, i.e., at the location where a track 8, 9 transitions to the boundary faces 6, 7 of the gap 2, there is a deviation a>0 of radius $R_{LT}$ from the circle line shown as a dashed line in FIG. 2. Owing to this divergence, the hypothetical center of the local transverse curvature of a track 8, 9 outside the contact angle regions $[\theta_{P1}-\Delta, \theta_{P1}+\Delta]$, $[\theta_{P2}-\Delta, \theta_{P2}+\Delta]$, $[\theta_{P3}-\Delta, \theta_{P3}+\Delta]$ and $[\theta_{P4}-\Delta, \theta_{P4}+\Delta]$ does not coincide with the circle line 10 or the ball center either, but deviates visibly from it. Several such deviating centers of curvature 15, 16 are illustrated in FIG. 1. In the region of the track edge 14, the osculation S is now only 90% to 50%.

Figure 3:
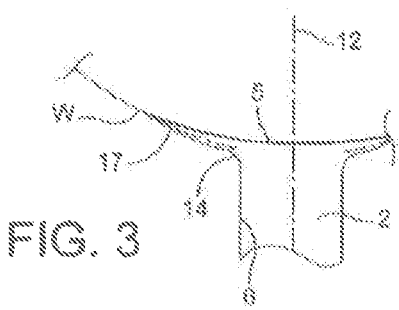
FIG. 3 shows another embodiment of the invention, in a representation approximately corresponding to FIG. 2.

FIG. 3 shows a further-modified embodiment of the invention, in which an inflection point W is formed in the cross-sectional contour of a track 8, 9, and past this point the track 8, 9 has at least regionally a convexly curved transverse shape. This convex region 17 can either extend all the way to the track edge 14, or it can pass through another inflection point and continue as a concave curve once again.

In the region of the equator of the ball 5, i.e., near the axis of symmetry 13 parallel to the base plane of the bearing, each of the tracks 8, 9 has a respective shallow, groove-shaped depression 18 that can serve as a supply pocket for grease.

The invention claimed is:

1. A ball bearing having a first and a second race and, disposed in a gap between the two said races, at least one row of balls of radius $R_K$ that roll along facing tracks of the two said races, wherein the centers (M) of the balls of a row move on a circular path surrounded by a torus circumscribing all the balls of said row and having the toroidal radius $R_K$, a toroidal angle coordinate $\phi$ and a poloidal angle coordinate $\theta$, and wherein cross sections of the two track contours are symmetrical to each other relative to a first axis of symmetry that extends centrally along the gap and remains equidistant from the two facing faces of the two races, whereby, perpendicular to the first axis of symmetry, at a level of a ball center or the circular path, there extends a second axis of symmetry parallel to a base plane of the ball bearing and which divides each of the two tracks into two sections, which are symmetrical to each other relative to the second axis of symmetry, and whereby the first and second axes of symmetry form a sort of coordinate intersection of a local Cartesian coordinate system resulting in the formation of a total of four quadrants, whereby each of the tracks exhibits with each of said balls two generally punctiform contact areas ($P_1$, $P_2$; $P_3$ $P_4$) at respective contact angles ($\theta_{P1}$, $\theta_{P2}$; $\theta_{P3}$ and $\theta_{P4}$), each one of the four generally punctiform contact areas ($P_1$, $P_2$; $P_3$ $P_4$) between a ball and both tracks being disposed in a different quadrant of the local Cartesian coordinate system, wherein in regions of the contact angles ($\theta_{P1}$, $\theta_{P2}$; $\theta_{P3}$ and $\theta_{P4}$) respective cross sections of the tracks are provided with transverse curvatures having finite radii of curvature ($R_{L1}$ ... $R_{L4}$), each of which is greater than the ball radius ($R_K$): $R_{Lv} > R_K$, $v = 1 \ldots 4$, wherein the transverse radius of curvature ($R_L$) of the tracks is, in the vicinity of said contact angles ($\theta_{P1}$, $\theta_{P2}$; $\theta_{P3}$ and $\theta_{P4}$), always a continuous and differentiable function of the poloidal angle coordinate $\theta$: $R_L = R_L(\theta)$ that increases outwardly from the respective contact-angle region ($\theta_{P1}$, $\theta_{P2}$; $\theta_{P3}$ and $\theta_{P4}$) in both poloidal directions: $R_L(\theta) \geq R_L(\theta_{Pv})$, such that, on the one hand, the transverse radius of curvature ($R_L$) of said tracks increases from the respective contact-angle region ($\theta_{P1}$, $\theta_{P2}$; $\theta_{P3}$ and $\theta_{P4}$) in a direction towards the gap near the first axis of symmetry, and, on the other hand, the transverse radius of curvature ($R_L$) of said tracks increases from the respective contact-angle region ($\theta_{P1}$, $\theta_{P2}$; $\theta_{P3}$ and $\theta_{P4}$) in the direction towards the innermost part of the track at the second axis of symmetry as well, wherein the first race exhibits a first planar contact face with fastening means in the form of coronally distributed bores for connection to a first foundation, a first frame, or a first machine or system part, while the second race exhibits a second planar contact face with fastening means in the form of coronally distributed bores for connection to a second frame, or a second machine or system part, wherein the first and second planar contact faces point in opposite axial directions and are both elevated in the axial direction of said ball bearing relative to the respective ring face of the other race, so that the plane of the ball bearing forms a plane of separation between the first and second frames, or machine or system parts, one of which is located above the plane of the ball bearing, while the other one is located below the plane of the ball bearing, and wherein both races have the same axial height, wherein the transverse curvature of the track contour in the vicinity of the contact angle regions $\theta_{P1}$, $\theta_{P2}$; $\theta_{P3}$ and $\theta_{P4}$ follows a potential function, or a progression, or an exponential function, or a combination of a plurality of such functions.

2. The ball bearing in accordance with claim 1, wherein track contour presents a finite osculation $S = (R_K/R_L) \cdot 100\% \neq 0$, with an exception of any inflection points (W) of the track curvature.

3. The ball bearing in accordance with claim 1, wherein in the region of the contact angles, where $\theta_{Pv} - 5° \leq \theta \leq \theta_{Pv} + 5°$, the track contour presents in each case an osculation $S = (R_K/R_L) \cdot 100\%$ between 98% to 90%.

4. The ball bearing in accordance with claim 1, wherein in the vicinity of the gap, the track contour presents an osculation $S = (R_K/R_L) \cdot 100\%$ between 90% to 50%.

5. The ball bearing in accordance with claim 1, wherein the transverse curvature of the tracks is provided with a non-circular contour, in the vicinity of the contact angle regions $\theta_{P1}$, $\theta_{P2}$; $\theta_{P3}$ and $\theta_{P4}$.

6. The ball bearing in accordance with claim 1, wherein the transverse curvature of the track contour exhibits at least one inflection point.

7. The ball bearing in accordance with claim 6, wherein at least one inflection point of the transverse curvature of the track is disposed in the vicinity of the bearing gap.

8. The ball bearing in accordance with claim 1, wherein said ball bearing comprises a selected one of a radial bearing and an axial bearing.

9. The ball bearing in accordance with claim 1, wherein said bores comprise a selected one of through-bores and blind bores.

10. The ball bearing in accordance with claim 9, wherein said bores are each provided with an internal thread.

11. A ball bearing having first and second races and, disposed in a gap between the first and second races, at least one row of balls of radius $R_K$ adapted to roll along facing tracks of the first and second races, wherein centers of the balls of a row of balls move on a circular path surrounded by a torus circumscribing all the balls of said row and having the toroidal radius $R_K$, a toroidal angle coordinate $\phi$, and a poloidal angle coordinate $\theta$, and wherein cross sections of track contours are symmetrical to each other relative to a first axis of symmetry that extends centrally along the gap and remains equidistant from the two facing faces of the first and second races, whereby, perpendicular to this first axis of symmetry, at a level of the ball center or the circular path, there extends a second axis of symmetry parallel to a base plane of the ball bearing, which divides each of the two tracks into two sections, which are symmetrical to each other relative to the second axis of symmetry, and whereby the first and second axes of symmetry form a coordinate intersection of a local Cartesian coordinate system resulting in the formation of four quadrants, whereby each track exhibits with each ball two generally punctiform contact areas, or contact points ($P_1$, $P_2$; $P_3$, $P_4$) at respective contact angles ($\theta_{P1}$, $\theta_{P2}$; $\theta_{P3}$ and $\theta_{P4}$), each one of the four punctiform contact areas or contact points ($P_1$, $P_2$; $P_3$ $P_4$) between a ball and both tracks being disposed in a different quadrant of the local Cartesian coordinate system, and wherein in a region of the contact angles ($\theta_{P1}$, $P_{P2}$; $\theta_{P3}$ and $\theta_{P4}$) respective cross sections of the tracks exhibit transverse curvatures with finite radii of curvature ($R_{L1}$ ... $R_{L4}$), each of which is greater than the ball radius ($R_K$): $R_{Lv} > R_K$, $v = 1 \ldots 4$, wherein a transverse radius of curvature ($R_1$) of said track is, in the vicinity of the contact angles ($\theta_{P1}$, $\theta_{P2}$; $\theta_{P3}$ and $\theta_{P4}$), always a continuous and differentiable function of the poloidal angle coordinate $\theta$: $R_L = R_L(\theta)$, wherein a) the transverse radius of curvature ($R_L$) of said tracks increases outward from the respective contact-angle region ($\theta_{P1}$, $\theta_{P2}$; $\theta_{P3}$ and $\theta_{P4}$) in both poloidal directions: $R_L(\theta) \geq R_L(\theta_{Pv})$, such that, (1) the transverse radius of curvature ($R_L$) of said tracks increases from the respective contact-angle region ($\theta_{P1}$, $\theta_{P2}$; $\theta_{P3}$ and $\theta_{P4}$) in the direction towards the gap near the first axis of symmetry, and (2) the transverse radius of curvature ($R_L$) of said tracks increases from the respective contact-angle region ($\theta_{P1}$, $\theta_{P2}$; $\theta_{P3}$ and $\theta_{P4}$) in the direction towards the innermost part of the track at the second axis of symmetry, b) wherein the first race exhibits a first planar contact face with fastening means in the form of coronally distributed bores for connection to a first foundation, a first frame, or a first machine or system part, while the second race exhibits a second planar contact face with fastening means in the form of coronally distributed bores for connection to a second frame, or a second machine or system part, wherein the first and second planar contact faces point in opposite axial directions and are both elevated in the axial direction of said ball bearing relative to the respective ring face of the other race, so that the plane of the ball bearing forms a plane of separation between the first and second frames, or machine system parts, one of which is located above the plane of the ball bearing, while the other is located below the plane of the ball bearing, c) wherein both races have the same axial height, d) wherein the transverse curvature of the track contour in the vicinity of the contact angle regions $\theta_{P1}$, $\theta_{P2}$; $\theta_{P3}$ and $\theta_{P4}$ follows a potential function, or a progression, or an exponential function, or a combination of a plurality of such functions.

12. The ball bearing as in claim 11, wherein the transverse radius of curvature ($R_L$) of the track(s) increases outwardly from the respective contact-angle region ($\theta_{P1}$, $\theta_{P2}$; $\theta_{P3}$ and $\theta_{P4}$) in at least one poloidal direction up to a convex transverse radius of curvature.

13. The ball bearing as in claim 11, wherein track contour presents a finite osculation $S=(R_K/R_L)\cdot 100\% \neq 0$, with an exception of any inflection points (W) of the track contour.

14. The ball bearing as in claim 11, wherein in the region of the contact angles, where $\theta_{PV}-5°\leq\theta\leq\theta_{PV}+5°$, the track contour presents an osculation $S=(R_K/R_L)\cdot 100\%$ between 98% to 90%.

15. The ball bearing as in claim 11, wherein in the vicinity of the gap, the track contour presents an osculation $S=(R_K/R_L)\cdot 100\%$ between 90% to 50%.

16. The ball bearing as in claim 11, wherein the transverse curvature of the track contour is provided with at least one inflection point.

17. The ball bearing as in claim 16, wherein at least one inflection point of the transverse curvature of the track contour is proximate the bearing gap.

18. The ball bearing as in claim 11, wherein said ball bearing comprises a selected one of a radial bearing and an axial bearing.

19. The ball bearing as in claim 11, wherein said bores comprise a selected one of through-bores and blind bores.

20. The ball bearing as in claim 19, wherein the bores are each provided with an internal thread.

21. A ball bearing having first and second races and, disposed in a gap between the two said races, at least one row of balls of radius $R_K$ adapted to roll along facing tracks of the first and second races, wherein centers of the balls of a row of balls move on a circular path surrounded by a torus circumscribing all the balls of a row, and having the toroidal radius $R_K$, a toroidal angle coordinate $\phi$, and a poloidal angle coordinate $\theta$, and wherein the cross sections of the two track contours are symmetrical to each other relative to a first axis of symmetry that extends centrally along the gap and remains equidistant from the two facing faces of the two races, whereby, perpendicular to this first axis of symmetry, at a level of the ball center or the circular path, there extends a second axis of symmetry parallel to the base plane of the ball bearing, which divides each of the two tracks into two sections symmetrical to each other relative to the second axis of symmetry, and whereby the first and second axes of symmetry form a coordinate intersection of a local Cartesian coordinate system resulting in the formation of four quadrants, whereby each track has with each ball two nearly punctiform contact areas or contact points ($P_1$, $P_2$; $P_3$ $P_4$) at respective contact angles ($\theta_{P1}$, $\theta_{P2}$; $\theta_{P3}$ and $\theta_{P4}$), each one of these four contact points ($P_1$, $P_2$; $P_3$, $P_4$) between a ball and both tracks being disposed in a different quadrant of the local Cartesian coordinate system, and wherein in a region of the contact angles ($\theta_{P1}$, $\theta_{P2}$; $\theta_{P3}$ and $\theta_{P4}$) respective cross sections of the tracks exhibit transverse curvatures with finite radii of curvature ($R_{L1}\ldots R_{L4}$), each of which is greater than the ball radius ($R_K$): $R_{L1}>R_K$, $R_{L2}>R_K$, $R_{L3}>R_K$, $R_{L4}>R_K$, wherein a transverse radius of curvature ($R_L$) of said track(s) is, in the vicinity of the contact angles ($\theta_{P1}$, $\theta_{P2}$; $\theta_{P3}$ and $\theta_{P4}$), always a continuous and differentiable function of the poloidal angle coordinate $\theta$: $R_L=R_L(\theta)$, wherein a) the transverse radius of curvature ($R_L$) of said track(s) increases outwardly from the respective contact-angle region ($\theta_{P1}$, $\theta_{P2}$; $\theta_{P3}$ and $\theta_{P4}$) in both poloidal directions: $R_L(\theta)\geq R_L(\theta_{Pv})$, such that, (1) the transverse radius of curvature ($R_L$) of said tracks increases from the respective contact-angle region ($\theta_{P1}$, $\theta_{P2}$; $\theta_{P3}$ and $\theta_{P4}$) in the direction towards the gap near the first axis of symmetry, and (2) the transverse radius of curvature ($R_L$) of said tracks increases from the respective contact-angle region ($\theta_{P1}$, $\theta_{P2}$; $\theta_{P3}$ and $\theta_{P4}$) in the direction towards the innermost part of the track at the second axis of symmetry as well, b) wherein the first race exhibits a first planar contact face with fastening means in the form of coronally distributed bores for connection to a first foundation, a first frame, or a first machine or system part, while the second race exhibits a second planar contact face with fastening means in the form of coronally distributed bores for connection to a second frame, or a second machine or system part, wherein the first and second planar contact faces point in opposite axial directions and are both elevated in the axial direction of said ball bearing relative to the respective ring face of the other race, so that the plane of the ball bearing forms a plane of separation between the first and second frames, or machine or system parts, one of which is located above the plane of the ball bearing, while the other one is located below the plane of the ball bearing, c) wherein both races have the same axial height, d) wherein the transverse curvature of the track contour in the vicinity of the contact angle regions $\theta_{P1}$, $\theta_{P2}$; $\theta_{P3}$ and $\theta_{P4}$ follows a potential function, or a progression, or an exponential function, or a combination of a plurality of such functions, e) and wherein the transverse curvature of the track contour is provided with at least one inflection point.

* * * * *